United States Patent
Moore et al.

(10) Patent No.: US 7,574,590 B2
(45) Date of Patent: Aug. 11, 2009

(54) METHOD FOR BOOTING A SYSTEM ON A CHIP INTEGRATED CIRCUIT

(75) Inventors: David Moore, Cedar Park, TX (US); Matthew Brady Henson, Austin, TX (US); Marc Kevin Jordan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 493 days.

(21) Appl. No.: 11/259,610

(22) Filed: Oct. 26, 2005

(65) Prior Publication Data

US 2007/0094486 A1    Apr. 26, 2007

(51) Int. Cl.
    *G06F 15/177*    (2006.01)
(52) U.S. Cl. .............................. 713/1; 713/2
(58) Field of Classification Search ............ 713/1, 713/2
    See application file for complete search history.

(56) References Cited

U.S. PATENT DOCUMENTS

| | | | | |
|---|---|---|---|---|
| 5,805,910 A | * | 9/1998 | Lee et al. ............... | 713/323 |
| 5,872,967 A | * | 2/1999 | DeRoo et al. ........... | 713/2 |
| 6,223,293 B1 | * | 4/2001 | Foster et al. ............ | 713/300 |
| 6,604,195 B1 | * | 8/2003 | Kumar et al. ........... | 713/2 |
| 7,000,102 B2 | * | 2/2006 | Kumar et al. ........... | 713/2 |
| 7,343,504 B2 | * | 3/2008 | Fernald et al. .......... | 713/322 |
| 2005/0114645 A1 | * | 5/2005 | Zimmer et al. .......... | 713/100 |
| 2005/0182977 A1 | * | 8/2005 | Powers et al. ........... | 713/300 |
| 2005/0246565 A1 | * | 11/2005 | Koarai .................... | 713/323 |

FOREIGN PATENT DOCUMENTS

JP    2000172574    *    6/2000

* cited by examiner

*Primary Examiner*—Chun Cao
(74) *Attorney, Agent, or Firm*—Toler Law Group

(57) ABSTRACT

A method for booting a system on a chip (IC) integrated circuit includes reading a warm boot flag stored in a persistent register of an analog portion of the system on a chip IC. A warm boot procedure is executed when the warm boot flag is set.

34 Claims, 10 Drawing Sheets

METHOD FOR BOOTING A SYSTEM ON A CHIP INTEGRATED CIRCUIT

CROSS REFERENCE TO RELATED PATENTS

Not applicable

BACKGROUND OF THE INVENTION

1. Technical Field of the Invention

The present invention relates to processing systems as may be used in system on a chip integrated circuits and related methods.

2. Description of Related Art

As is known, integrated circuits are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices includes one or more integrated circuits to provide the functionality of the device. As an example, a handheld FM radio receiver may include multiple integrated circuits to support the reception and processing of broadcast radio signals in order to produce an audio output that is delivered to the user through speakers, headphones, or the like. Many such integrated circuits include a processing device that executes a program that includes a sequence of instructions that are stored in a memory device.

FIG. 1 presents a schematic block diagram representation of a prior art processing system 120. In particular, the processing system 120 is presented for executing a main program 112. Processing system 120 includes a processor 100 that is coupled to read only memory (ROM) device 102, random access memory (RAM) device 104, and flash memory device 106 via bus 108. As implemented in the prior art, a boot loader 110 is stored in ROM device 102. When the processing system 120 is booted, the boot loader 110 is executed by processor 100. Boot loader 110 includes operational instructions that cause the processor to retrieve the main program 112 and associated data stored in flash memory device 106 or on other external media, and to copy the main program 112 to the RAM device 104 (the copy being shown as main program 112'). The boot loader 110 further includes an instruction to jump to the main program 112' stored in the RAM device 104 to begin execution of the main program 112'.

One problem with this prior art implementation is the amount of time required to execute the boot program. In particular, if the main program and associated data are lengthy, and/or if these files are encrypted and must be decrypted prior to copying and storage in RAM device 104, the copying and storage can require an undesirable amount of time. The need exists for a processing system that can be powered off and booted in an effective manner requiring as little time as possible, particularly for use in system on a chip integrated circuits and in handheld electronic devices.

DETAILED DESCRIPTION OF THE INVENTION INCLUDING THE PRESENTLY PREFERRED EMBODIMENTS

Figure 1:
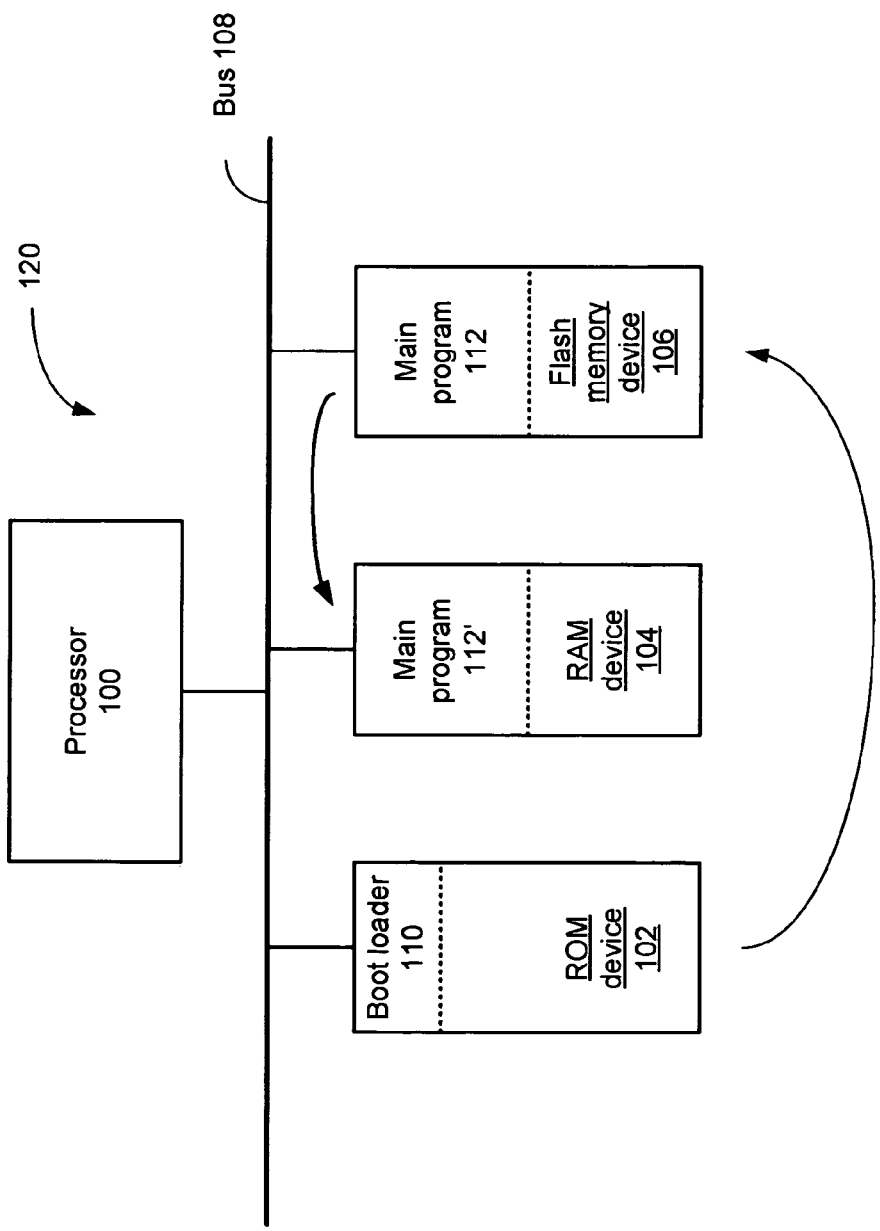
FIG. 1 presents a combination schematic/block diagram representation of a prior art processing system 120.
Figure 2:
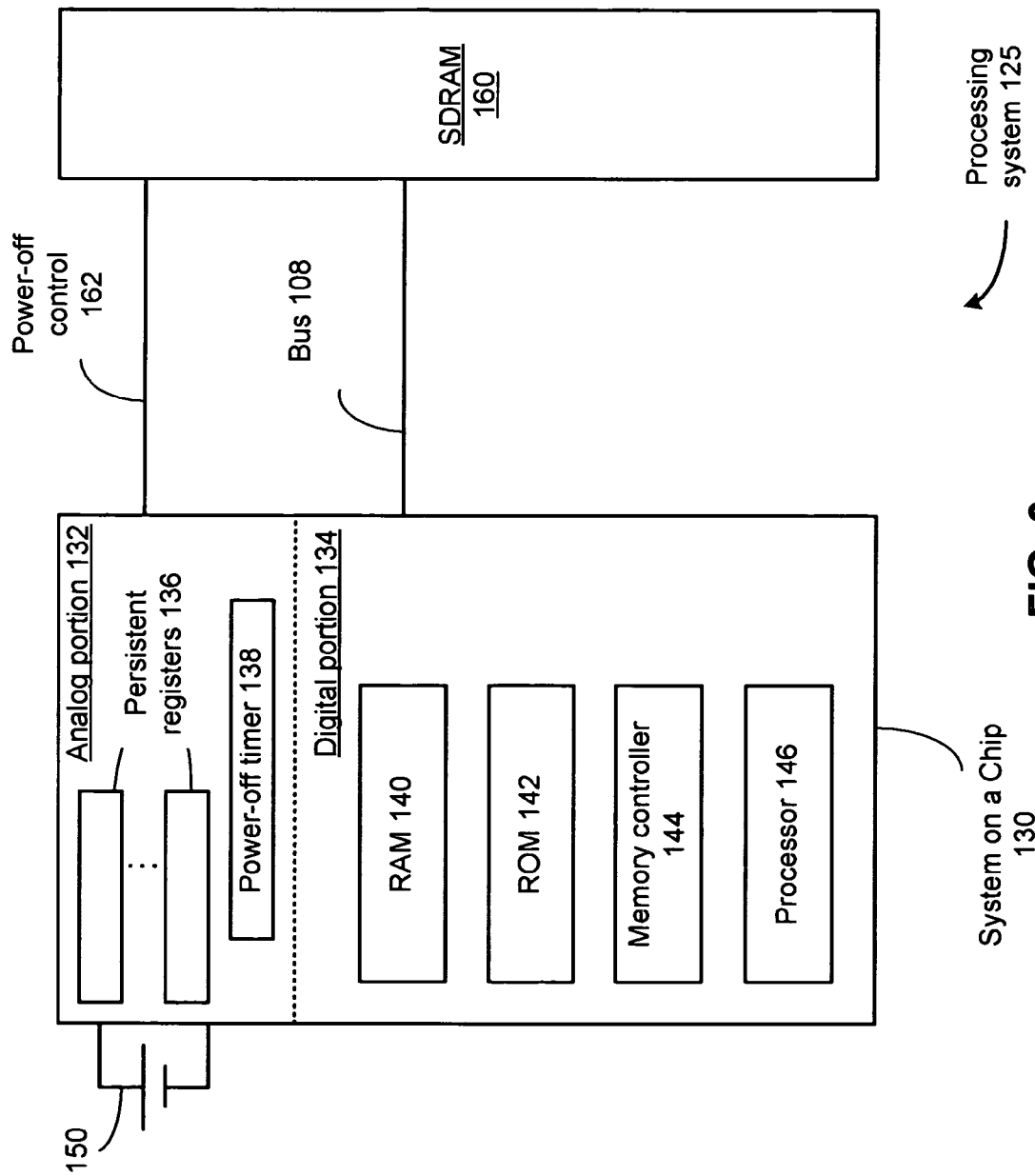
FIG. 2 presents a block diagram representation of a processing system 125 in accordance with an embodiment of the present invention.

FIG. 2 presents a block diagram representation of a processing system 125 in accordance with an embodiment of the present invention. In particular, processing system 125 includes system on a chip 130, powered by a power source such as battery 150, and coupled to an external memory device such as synchronous dynamic random access memory (SDRAM) 160, via bus 108. System on a chip 130 has a digital portion 134 that includes an on-chip processor 146, memory controller 144, read only memory (ROM) 142 and random access memory (RAM) 140.

In addition, system on a chip 130 has an analog portion 132 that includes one or more persistent registers 136 that can store data from the digital portion 134. In operation of the system on a chip 130, the digital portion 134 can be powered off, while the analog portion 132 remains on. Data remains stored in persistent registers 136 as long as the analog portion 132 is on. In this mode, the system on a chip 130 conserves battery power because the analog portion 132 consumes much less power than the digital portion 134. In embodiments of the present invention, the analog portion 132 can include all of the analog circuitry that is present on system on a chip 130. However, analog portion 132 may also comprise any subset of the analog circuitry of system on a chip 130. In an alternative embodiment of the present invention, analog portion is limited to one persistent register 136. Similarly, the digital portion 134 may include as few as one digital element, such as RAM 140, or as much as all of the digital circuitry of system on a chip 130.

In an embodiment of the present invention, analog portion 132 further includes a power-off timer 138 that can be either enabled or disabled. When enabled and set with a count down value corresponding to a time duration T, power-off timer 138 counts down until either a power-up command is received, the power-off timer 138 is otherwise disabled, or the time period T expires. If the time period T expires without the power-off timer 138 being disabled and without receiving a power-up command, the analog power-up timer can optionally control the power to an external device, such as SDRAM 160, via power off control line 162. In addition, power-off timer 138 can power off the analog portion 132 of system on a chip 130.

In normal operation, the processor 146 executes one or more programs that may include an operating system program, application or other program (e.g., MP3 and/or WMA digital audio playback, file transfer, MPEG, video playback, JPEG display, audio, video and/or still image recording, etc.), series of programs, or subroutines that comprises one or more operating instructions for a processor 146. In an embodiment of the present invention, the user can provide a command or indication that causes a hibernate mode to be entered by the device that does not fully power down the device immediately. Rather, the device stores information relating to its current state in a portion of the device that remains on in a low power state.

In an embodiment of the present invention, when the digital portion 134 is powered up, a boot procedure is run by processor 146 that include the step of reading a warm boot flag stored in a persistent register 136 of analog portion 132. When the warm boot flag is set, such as when processing system 125 is in a hibernate mode, a warm boot procedure is executed by processor 146. In a preferred embodiment of the present invention, the warm boot procedure requires less time to execute than other boot procedures. This allows the user to sooner enjoy the features and functions allowed in normal operation of the device, such as a handheld device, that incorporates system on a chip 130.

Further functions and features of the invention will be discussed in the Figures that follow.

Figure 3:
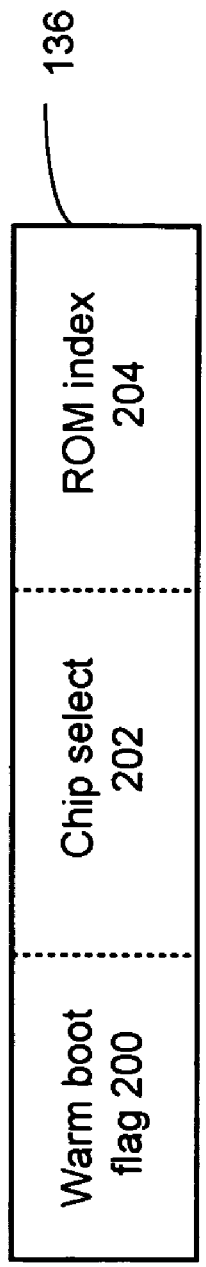
FIG. 3 presents a block diagram representation of the contents of persistent register 136 in accordance with an embodiment of the present invention.

FIG. 3 presents a block diagram representation of the contents of persistent register 136 in accordance with an embodiment of the present invention. In particular, persistent register 136 stores a plurality of data in binary format that includes, a warm boot flag 200, a chip select 202 and a ROM index 204. In accordance with an embodiment of the present invention, the warm boot flag includes a binary value that indicates whether or not the warm bit flag is set. The chip select 202 includes data that indicates the location and connectivity of SDRAM 160 that is sufficient for memory controller 144 to communicate with SDRAM 160. ROM index 204 contains an index to ROM table 142 for the memory parameters that correspond to SDRAM 160 as will be described further in conjunction with FIG. 4.

Figure 4:
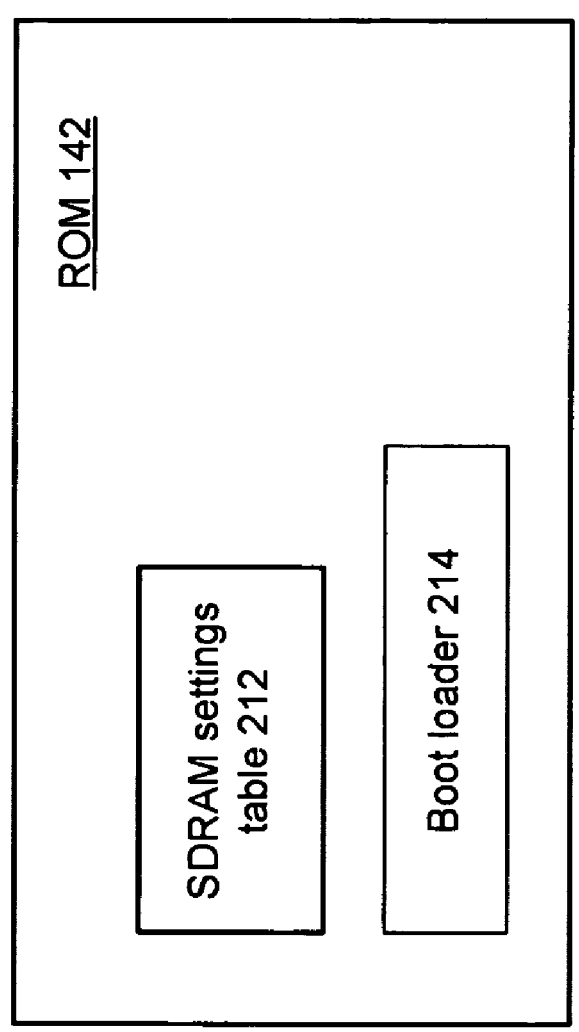
FIG. 4 presents a block diagram representation of a ROM 142 in accordance with an embodiment of the present invention.

FIG. 4 presents a block diagram representation of a ROM 142 in accordance with an embodiment of the present invention. In particular, ROM 142, includes boot loader 214. Boot loader 214 comprises a series or operational instructions that includes both a warm boot procedure and a cold boot procedure. In addition, ROM 142 includes SDRAM settings table.

In an embodiment of the present invention, the SDRAM settings table 212 includes a plurality of memory parameters for various SDRAM devices that may be connected to system on a chip 130. In accordance with an embodiment of the present invention, a memory size parameter is stored corresponding to SDRAM sizes in the range of 2MB or higher, however, other sizes, in particular greater SDRAM sizes can likewise be implemented in accordance with the broad scope of the present invention. For each SDRAM memory size parameter, at least one memory timing parameter is also stored. In an embodiment of the present invention, three timing parameters are stored for each memory size, however, any number of timing parameters could likewise be stored, based on the number of operating modes, and the number of desired timing parameters for each memory size. Each set of possible memory size parameter and memory timing parameter has a corresponding ROM index. The particular combination of size and timing parameters, such as the parameters corresponding to SRDAM 160, can be accessed in SDRAM settings table 212 of ROM 142, by a particular ROM index 204. A tabular representation of an example of SDRAM settings table 212 is shown below.

| SDRAM Settings Table | |
|---|---|
| Index | Memory parameters |
| 0 | (2 MB, 24 MHz) |
| 1 | (2 MB, 48 MHz) |
| . | . |
| . | . |
| . | . |

Figure 5:
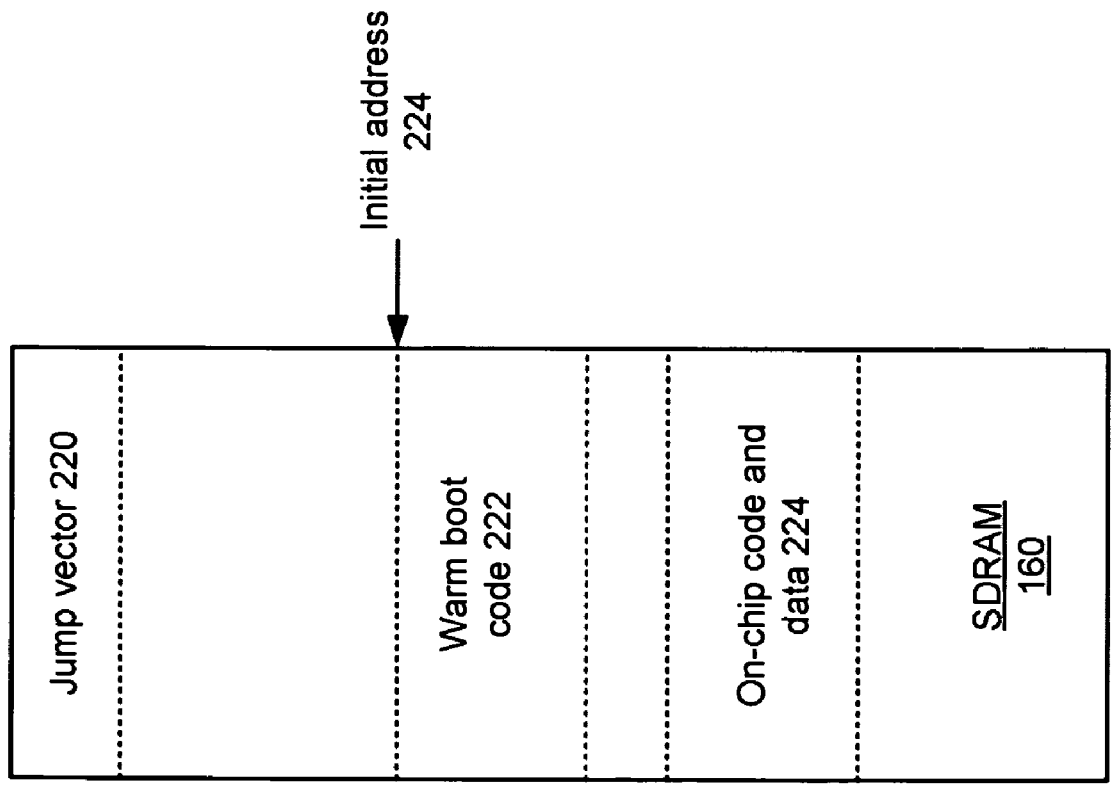
FIG. 5 presents a block diagram representation of SDRAM 160 in accordance with an embodiment of the present invention.

FIG. 5 presents a block diagram representation of SDRAM 160 in accordance with an embodiment of the present invention. In particular, SDRAM 160 includes a jump vector 220 in the first 32 bits of memory that stores the initial address 224 of warm boot code 222. In addition, SDRAM 160 includes on-chip code and data 224. In a preferred embodiment of the present invention, SDRAM 160 is capable of entering a self-refresh mode that consumes less power than when SDRAM 160 is in an active state corresponding to its normal mode of operation. In the self-refresh mode, SDRAM 160 is in a low power state where the contents of SDRAM 160 are still stored, but cannot be accessed.

Figure 6:
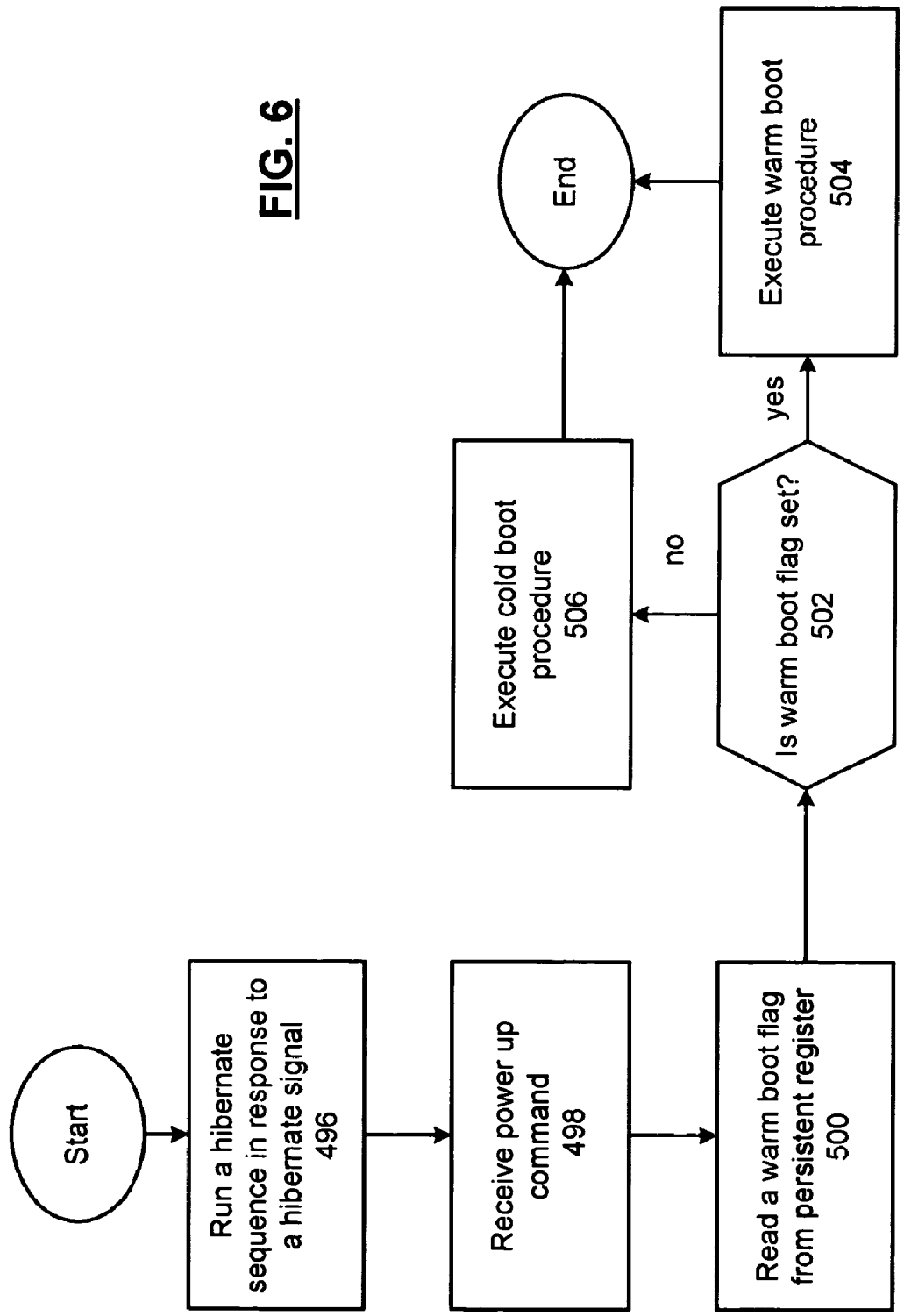
FIG. 6 presents a flowchart representation of method of restarting a system on a chip IC in accordance with an embodiment of the present invention.

FIG. 6 presents a flowchart representation of method of restarting a system on a chip IC in accordance with an embodiment of the present invention. In particular, a method is presented for use with a processing system such as processing system 125, and a system on a chip IC such system on a chip 130, that have been described in conjunction with FIGS. 2-5. The method begins in step 496 by running a hibernate sequence in response to a hibernate signal. This places the system on a chip 130 in a hibernate mode until a power-up command is received as shown in step 498. In an embodiment of the present invention, a power-up command is generated in response to a power-up button being activated by the user or by a power-up sequence otherwise being initiated, either automatically, in response to the detection of an event or other condition, or in response to some other user input such as a touch screen, wheel, voice command or other input. The method continues in step 500 by reading a warm boot flag stored in a persistent register. In step 502, the method determines if a warm boot flag has been set. In step 504, the method executes a warm boot procedure when the warm boot flag is set. When the warm boot flag is not set, a cold boot procedure is executed as shown in step 506.

In a preferred embodiment of the present invention, the method is executed as a series of operational instructions run on a processor such as processor 146. When system on a chip 130 receives a power-up command, the boot procedure begins by executing the ROM instructions of at least a portion of boot loader 214.

Figure 7:
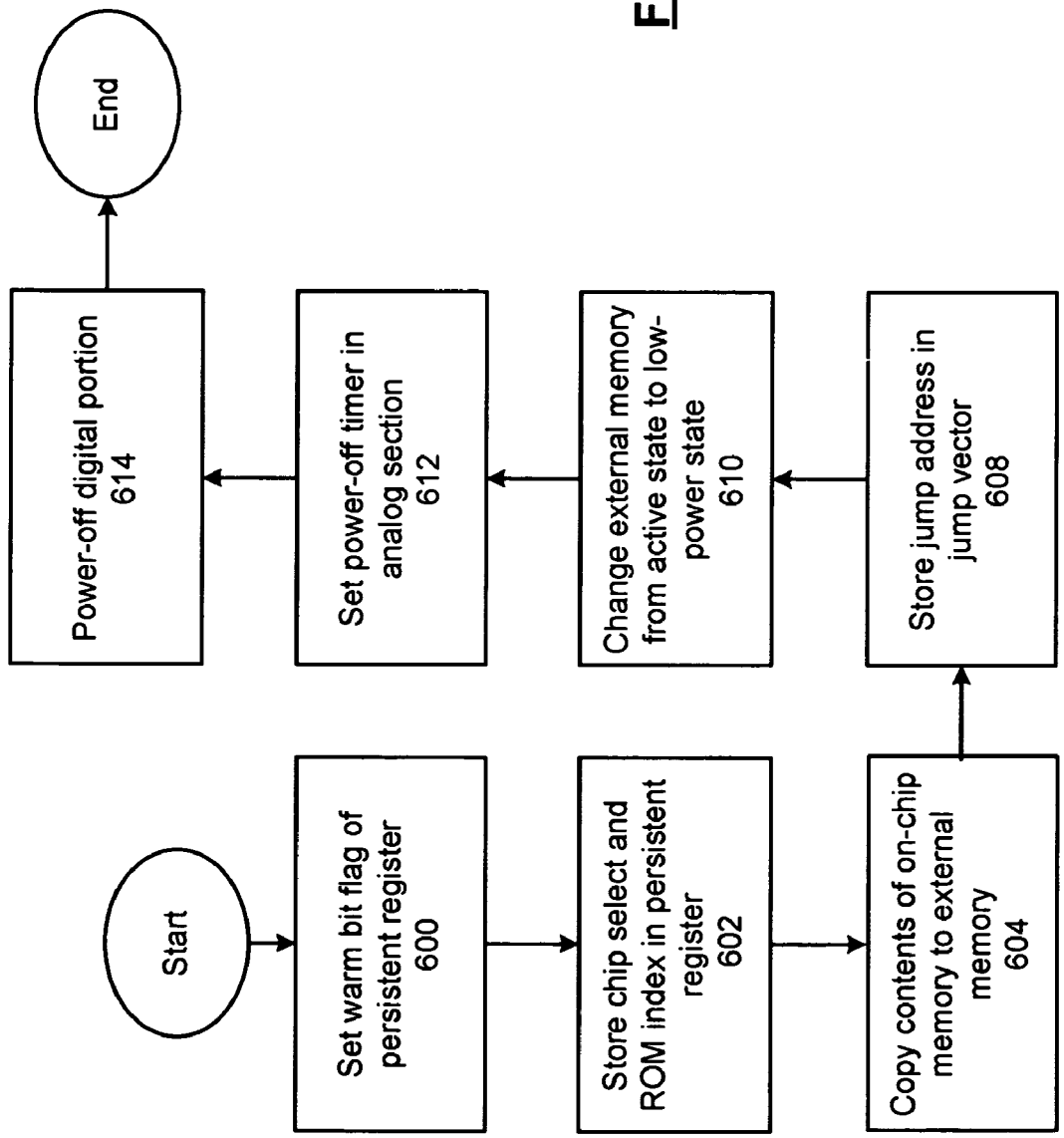
FIG. 7 presents a flowchart representation of a hibernate sequence in accordance with an embodiment of the present invention.

FIG. 7 presents a flowchart representation of a hibernate sequence in accordance with an embodiment of the present invention. In particular, a hibernate sequence is presented that can be used in conjunction the methods described in conjunction with FIG. 6 to generate a hibernate mode. In a preferred embodiment of the present invention, the method is triggered by a hibernate signal that is generated when the user of a device that incorporates a processing system such as processing system 125, issues a power-off command or other command or indication of the user that a hibernate mode is desired. In an embodiment of the present invention, the user may press a button, such as a power-off or hibernate button or some other user input such as a touch screen, wheel, voice command or other input to trigger the hibernate signal. In an alternative embodiment of the present invention, the hibernate signal is generated by the device after a period of inactivity from the user, a low battery condition, or in response to some other event or condition.

The method begins in step 600 by setting a warm bit flag of a persistent register, such as at least one persistent register 136. The method continues in step 602 by storing a chip select, such as chip select 202 and ROM index, such as ROM index 204, in the persistent register. In step 604, contents of the on-chip memory, such as some selected portion or all of the contents stored in RAM 140 are copied to an external memory such as SDRAM 160. In an embodiment of the present invention, the contents include on-chip code and data 224 that include programs commands, register values and other data that will allow the operation of one or more programs of system on a chip 130 to be continued after being powered back up. In step 608, an initial address of warm boot code 222 is stored in jump vector 220. In step 610, the external memory is changed from an active state to a low power state. In step 612, a power-off timer, such as power off timer 138 is set. In step 614, the digital portion 134 of the system on a chip 130 is turned off.

In this hibernate mode, the contents of SDRAM 160 and persistent registers 136 are maintained, while the system on a chip 130 and SDRAM 160 operate in corresponding low power states. In an embodiment of the present invention, if the power-off timer 138 expires after time T, without a power up command being received, a full power down of system on a chip 130 and SDRAM 160 occurs. This optional power-off routine saves battery life by reducing the power consumption further due to power off of system on a chip 130 and SDRAM 160. In this circumstance, the contents of persistent register 136 are lost, resetting the warm boot flag 200. When a power-up command is subsequently received, processor 146 will proceed to execute a cold boot sequence stored in boot loader 214 of ROM 142. If however, a power-up command is received before the power-off timer 138 expires, the warm boot procedure may be implemented as described herein.

In an embodiment of the present invention, when power-off timer 138 expires after time T, the digital portion 134 is powered up and a warm boot sequence is executed. Warm boot code 222 begins by determining if the power-off timer 138 expired, and if so, proceeds to implement the optional power-off routine discussed above. If a power-up command is received before the power-off timer expires, the warm boot code 222 continues with the remaining warm boot procedure. In an alternative embodiment of the present invention, other power-off routines can be employed including a direct power-off system on a chip 130 and SDRAM 160 through operation of the analog portion 132 by means of a power switch or other power down or power reduction technique.

While a particular hibernate mode has been described above, other hibernate modes and multiple hibernate modes corresponding to multiple warm boot procedures, are likewise possible within the broad scope of the present invention. In particular, other hibernate modes that correspond to alternate analog and digital portions of system on a chip 130 can be implemented. Multiple analog portions and multiple digital portions of system on a chip 130 may be powered on and powered off separately.

Figure 8:
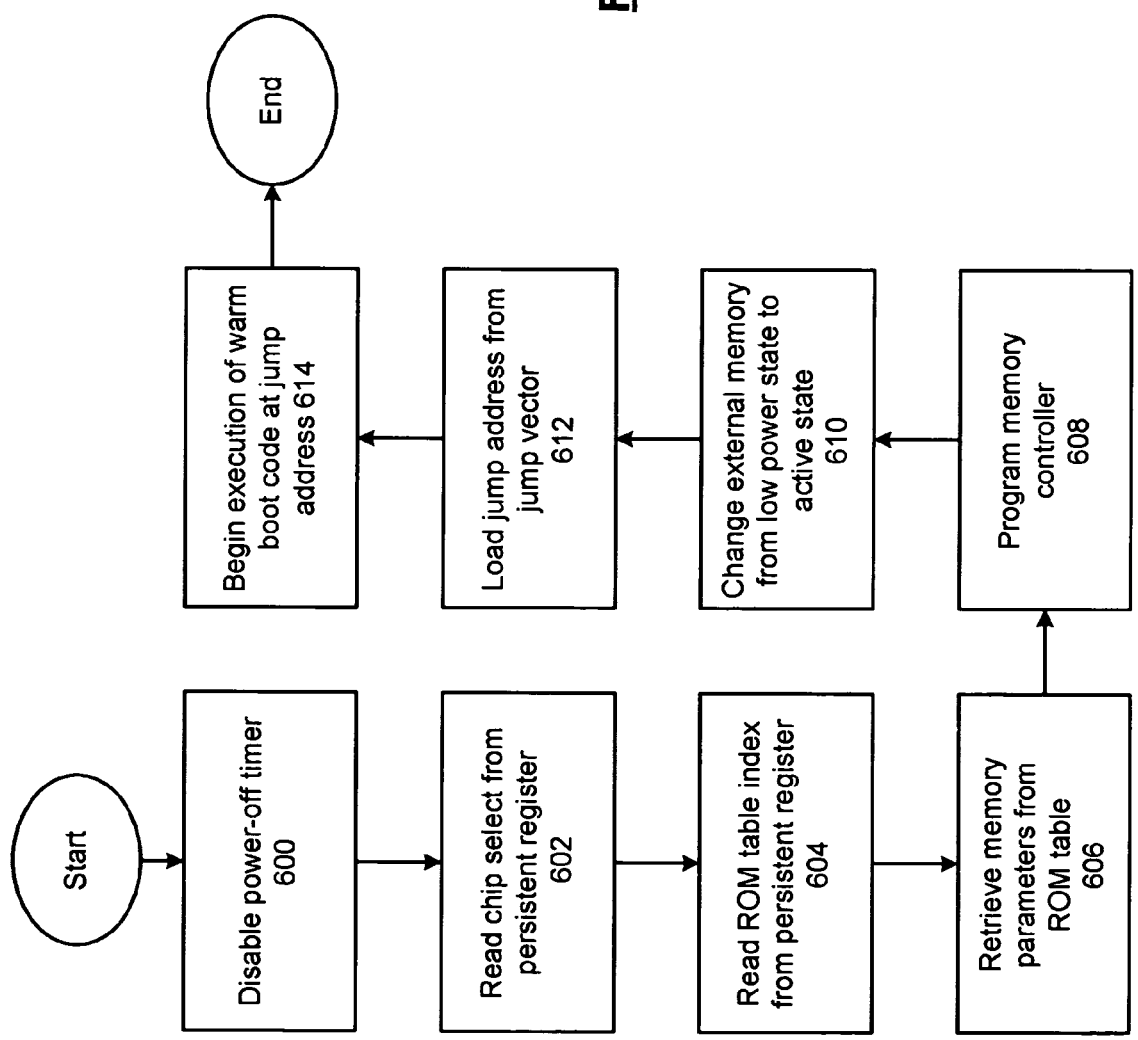
FIG. 8 presents a flowchart representation of a particular warm boot procedure in accordance with an embodiment of the present invention.

FIG. 8 presents a flowchart representation of a particular warm boot procedure in accordance with an embodiment of the present invention. In particular, a method is presented for use in conjunction with the method of FIG. 6. The method begins in step 600 by disabling the power-off timer. This discontinues the power-off timing procedure run by a power-off timer, such as power off timer 138. In step 602 the method continues by reading the chip select data from the persistent register, such as chip select 202 from persistent register 136. In step 604 the method continues by reading a ROM table index, such as ROM index 204 from persistent register 136. In step 606 the method retrieves memory parameters such as a memory size parameter and memory timing parameter from a ROM table, such as ROM settings table 212. In step 608, a memory controller, such as memory controller 144 is programmed with data retrieved in steps 602, 604 and 606. In step 610, the external memory, such as SDRAM 160, is changed from a low power state to an active state. In step 612, a jump address is retrieved from a jump vector, such as jump vector 220 of SDRAM 160. In step 614 a jump command is executed by the processor to begin execution the warm boot code stored in external memory.

As described above, the boot procedure for system on a chip 130 and processing system 125 begins with operational instructions stored in ROM such as on-chip ROM 142 and continues with operational instructions stored in external memory, such as warm boot code 222 of SDRAM 160. Advantageously, the method described above avoids fully powering off SDRAM 160 and losing the contents stored therein. In particular, the method avoids copying (and the possible decrypting) of the programs and data in SDRAM 160 during a cold boot operation. The warm boot procedure can therefore run more quickly.

While a particular warm boot procedure has been described above, other warm boot procedures corresponding to other hibernate modes and multiple hibernate modes corresponding to multiple warm boot procedures, are likewise possible within the broad scope of the present invention. In particular, other warm boot procedures that correspond to alternate analog and digital portions of system on a chip 130 can be implemented. While the warm boot flag described herein has been described in terms of a single warm boot sequence, on indication of which, of a plurality of warm boot sequences to be executed, can also be implemented in accordance with this alternative embodiment of the present invention.

Figure 9:
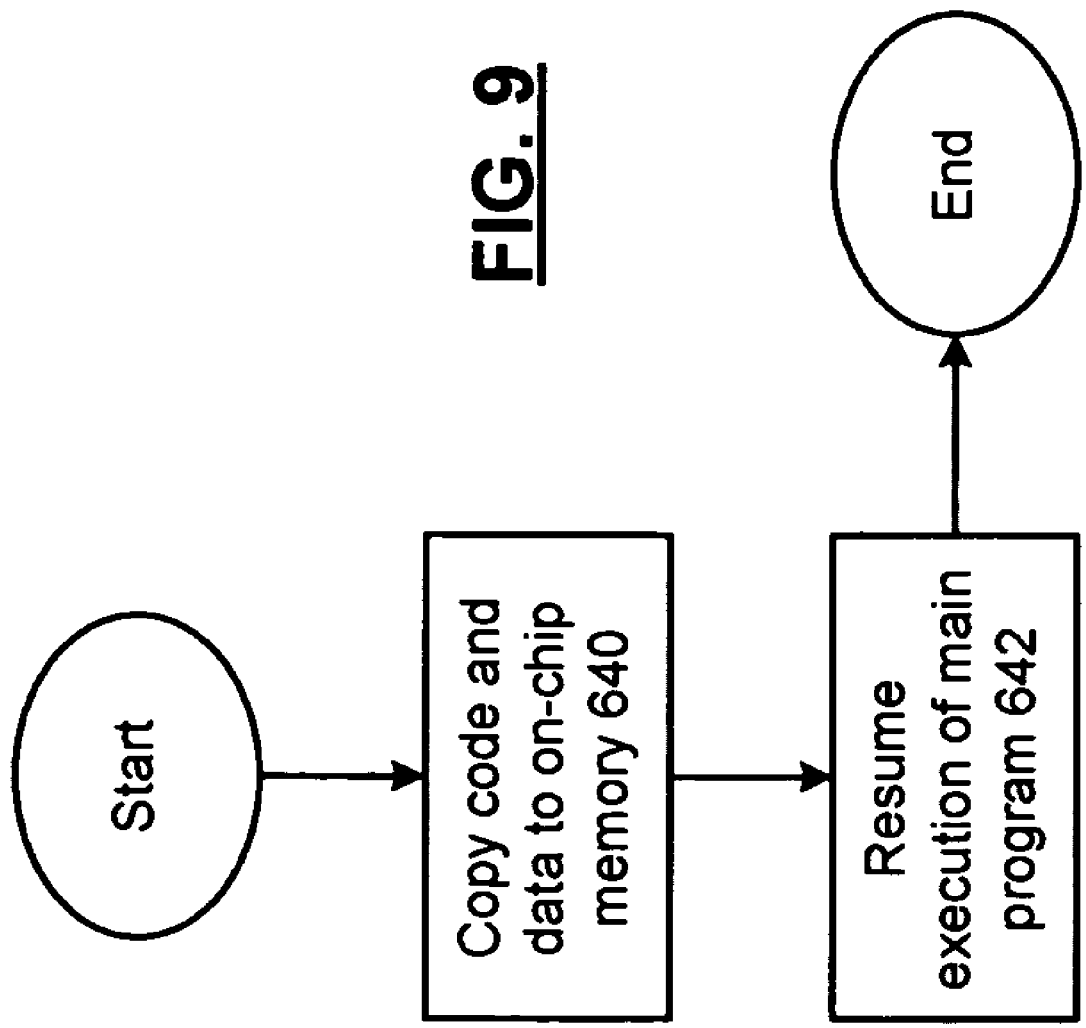
FIG. 9 presents a flowchart representation of a method in accordance with an embodiment of the present invention.

FIG. 9 presents a flowchart representation of a method in accordance with an embodiment of the present invention. In particular, a method is presented that can be implemented in the operational instructions stored as a portion of the warm boot code in SDRAM 160. The method begins in step 640 by copying code and data, such as on-chip code and data 224 of SDRAM 160 to an on chip memory such as RAM 140. Advantageously, this places the system on a chip 130 in a similar condition as when it was powered off, allowing the operation of the program or programs of system on a chip 130 to optionally continue substantially where the program or programs left off when the chip was powered off.

While the term "copying" is used herein, this term includes the use of processor block copy commands, retrieve and store commands, and other program commands, direct memory access (DMA) hardware that depend upon the processor and/or other implementation, as will be understood by one of ordinary skill in the art when presented the disclosure of the present invention.

Figure 10:
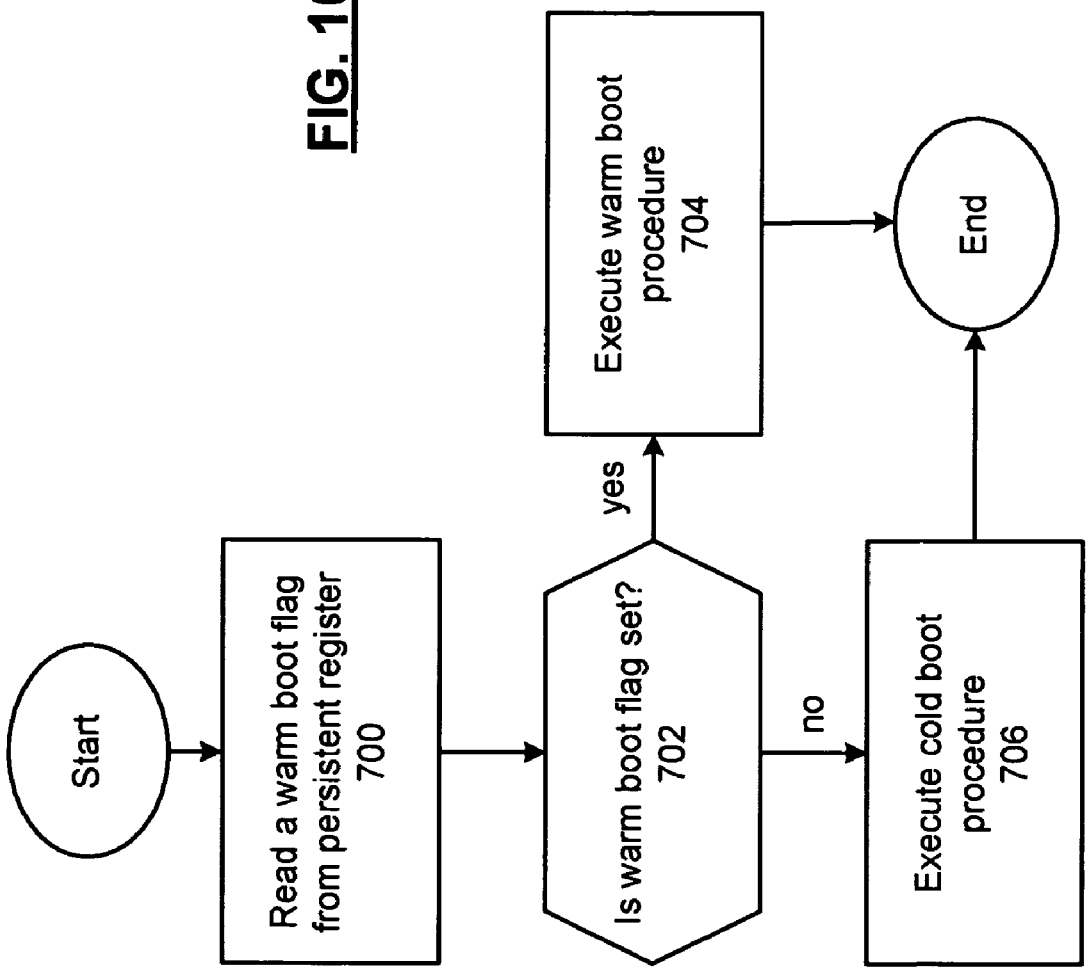
FIG. 10 presents a flowchart representation of method of booting a system on a chip IC in accordance with an embodiment of the present invention.

FIG. 10 presents a flowchart representation of method of booting a system on a chip IC in accordance with an embodiment of the present invention. In particular, a method is presented for use with a processing system such as processing system 125, and a system on a chip IC such system on a chip 130, that have been described in conjunction with FIGS. 2-9. The method begins in step 700 by reading a warm boot flag stored in a persistent register. In step 702, the method determines if a warm boot flag has been set. In step 704, the method executes a warm boot procedure when the warm boot flag is set. When the warm boot flag is not set, a cold boot procedure is executed as shown in step 706.

In an embodiment of the present invention, the cold boot procedure is stored entirely in boot loader 214 of ROM 142. This cold boot procedure is executed when all, or substantially all of system on a chip 130 has been powered down, prior to the execution of the boot loader, or otherwise when a complete system restart is desired for system stability, system malfunction or for other purposes. In an embodiment of the present invention, the cold boot procedure includes the necessary steps to initialize the operation of system on a chip 130 during a power up sequence.

Figure 12:
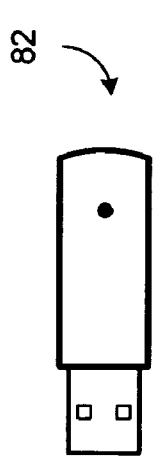
FIGS. 11-13 present pictorial diagrams of various devices in accordance with an embodiment of the present invention.
Figure 13:
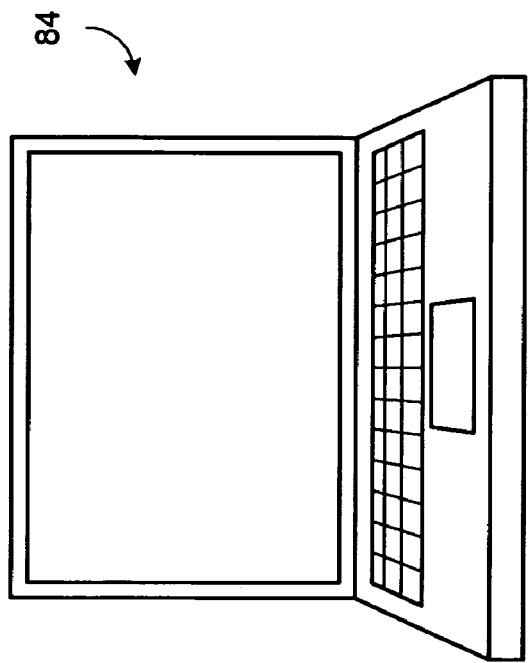
Figure 11:
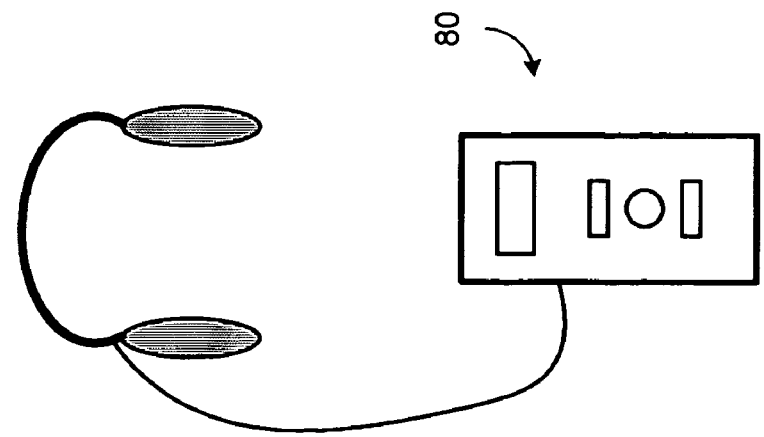

FIGS. 11-13 present pictorial diagrams of various devices in accordance with an embodiment of the present invention. While the preceding disclosure has been directed to a system on a chip integrated circuit 130 used in conjunction with a processing system 125, in an embodiment of the present invention, system on a chip integrated circuit 130 and/or processing system 125 can be used in a wide variety of electronic devices such as handheld audio system 80, universal serial bus (USB) device 82, in computer 84, or in a variety of other electronic devices that employ processing systems and/or other similar devices.

The various processors disclosed herein can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory stores, and the processing module executes, operational instructions corresponding to at least some of the steps and/or functions illustrated herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

In preferred embodiments, the various circuit components are implemented using 0.08 to 0.35 micron CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing a system on a chip integrated circuit and processing system. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method for restarting a system on a chip integrated circuit (IC), the method comprising:

running a hibernate sequence, in response to a hibernate signal, to place the system on a chip IC in a hibernate mode;

receiving a power up command;

reading a warm boot flag stored in a persistent register of an analog portion of the system on the chip IC, the analog portion including a power-off timer; and executing a warm boot procedure when the warm boot flag is set, wherein the warm boot procedure includes reading a memory index from the persistent register and programming a memory controller with the memory index, wherein the memory index is an index to a table for memory parameters that correspond to an external memory device.

2. The method for restarting the system on a chip IC of claim 1 further comprising:

executing a cold boot procedure when the warm boot flag is not set.

3. The method for restarting the system on a chip IC of claim 1 wherein the table for memory parameters that correspond to the external memory device is a read-only memory (ROM) table.

4. The method for restarting the system on a chip IC of claim 1 wherein the warm boot procedure further includes retrieving from a read only memory device at least one of: a memory timing parameter, and a memory size parameter.

5. The method for restarting the system on a chip IC of claim 1 wherein the warm boot procedure further includes changing the external memory device from a low power state to an active state.

6. The method for restarting the system on a chip IC of claim 1 wherein the warm boot procedure further includes loading a jump address stored in a jump vector and jumping to a warm boot code section stored in the external memory device beginning at the jump address.

7. The method for restarting the system on a chip IC of claim 6 wherein the warm boot procedure further includes copying a portion of the external memory device to an on-chip memory.

8. The method for restarting the system on a chip IC of claim 1 wherein the warm boot procedure further includes disabling the power-off timer.

9. The method for restarting the system on a chip IC of claim 1 wherein running the hibernate sequence includes setting the warm boot flag in the persistent register.

10. The method for restarting the system on a chip IC of claim 1 wherein running the hibernate sequence includes writing at least one memory parameter to the persistent register.

11. The method for restarting the system on a chip IC of claim 1 wherein running the hibernate sequence includes copying a portion of an on-chip memory to the external memory device.

12. The method for restarting the system on a chip IC of claim 11 wherein running the hibernate sequence includes storing a jump address in a jump vector of the external memory device.

13. The method for restarting the system on a chip IC of claim 12 wherein running the hibernate sequence includes changing the external memory device from an active state to a low power state.

14. The method for restarting the system on a chip IC of claim 1 wherein running the hibernate sequence includes setting the power-off timer for the analog portion of the system on a chip IC.

15. The method for restarting the system on a chip IC of claim 1 wherein running the hibernate sequence includes powering off the analog portion of the system on a chip IC when the power-off timer expires before receiving the power-up command.

16. The method for restarting the system on a chip IC of claim 1 wherein the system on a chip IC further includes a digital portion and wherein running the hibernate sequence includes powering off the digital portion.

17. A system on a chip integrated circuit (IC) comprising:
an analog portion that includes a persistent register and a power-off timer;
a digital portion, operably coupled to the analog portion, the digital portion including a processor that, during a boot procedure, executes operational instructions that include:
reading a warm boot flag stored in the persistent register; and
executing a warm boot procedure when the warm boot flag is set, wherein the warm boot procedure includes reading a memory index from the persistent register and programming a memory controller with the memory index, wherein the memory index is an index to a table for memory parameters that correspond to an external memory device, wherein the analog portion can remain in an on-state, while the digital portion is in an off-state.

18. The system on a chip IC of claim 17 wherein the table for memory parameters that correspond to the external memory device is a read-only memory (ROM) table.

19. The system on a chip IC of claim 17 wherein the operational instructions further include:
executing a cold boot procedure when the warm boot flag is not set.

20. The system on a chip IC of claim 17 wherein the memory controller is operably coupled to the external memory device.

21. The system on a chip IC of claim 17 wherein the digital portion further includes a read only memory device, and wherein the warm boot procedure further includes retrieving from the read only memory device at least one of: a memory timing parameter, and a memory size parameter.

22. The system on a chip IC of claim 20 wherein the warm boot procedure further includes changing the external memory device from a low power state to an active state.

23. The system on a chip IC of claim 20 wherein the warm boot procedure further includes loading a jump address stored in the external memory device and jumping to a warm boot code section stored in the external memory device beginning at the jump address.

24. The system on a chip IC of claim 23 wherein the digital portion further includes an on-chip memory and wherein the warm boot procedure further includes copying a portion of the external memory device to an on-chip memory.

25. The system on a chip IC of claim 17 wherein the warm boot procedure further includes disabling the power-off timer.

26. A method for booting a system on a chip integrated circuit (IC), the method comprising:
reading a warm boot flag stored in a persistent register of an analog portion of the system on a chip IC, the analog portion including a power-off timer; and
executing a warm boot procedure when the warm boot flag is set, wherein the warm boot procedure includes reading a memory index from the persistent register and programming a memory controller with the memory index, wherein the memory index is an index to a table for memory parameters that correspond to an external memory device.

27. The method for booting a system on a chip IC of claim 26 wherein the table for memory parameters that correspond to the external memory device is a read-only memory (ROM) table.

28. The method for booting the system on a chip IC of claim 26 further comprising:
executing a cold boot procedure when the warm boot flag is not set.

29. The method for booting the system on a chip IC of claim 26 wherein the warm boot procedure further includes retrieving from a read only memory device at least one of: a memory timing parameter, and a memory size parameter.

30. The method for booting the system on a chip IC of claim 26 wherein the warm boot procedure further includes changing a memory device from a low power state to an active state.

31. The method for booting the system on a chip IC of claim 26 wherein the warm boot procedure further includes loading a jump address stored in a jump vector and jumping to a warm boot code section stored in a memory device beginning at the jump address.

32. The method for booting the system on a chip IC of claim 31 wherein the warm boot procedure further includes copying a portion of the memory device to an on-chip memory.

33. The method for booting the system on a chip IC of claim 26 wherein the warm boot procedure further includes disabling the power-off timer.

34. The method for booting a system on a chip IC of claim 26 further comprising:

determining if the power-off timer has expired; and
executing a power-off routine when the power-off timer has expired.

* * * * *